United States Patent
Heo et al.

(10) Patent No.: US 8,948,092 B2
(45) Date of Patent: Feb. 3, 2015

(54) METHOD AND APPARATUS FOR RECEIVING A CONTROL CHANNEL IN A MOBILE COMMUNICATION SYSTEM

(75) Inventors: Youn-Hyoung Heo, Gyeonggi-do (KR); Joon-Young Cho, Gyeonggi-do (KR); Yujian Zhang, Beijing (CN); Ju-Ho Lee, Gyeonggi-do (KR); Jin-Kyu Han, Seoul (KR)

(73) Assignee: Samsung Electronics Co., Ltd. (KR)

( * ) Notice: Subject to any disclaimer, the term of this patent is extended or adjusted under 35 U.S.C. 154(b) by 991 days.

(21) Appl. No.: 12/052,226

(22) Filed: Mar. 20, 2008

(65) Prior Publication Data
US 2008/0232322 A1     Sep. 25, 2008

(30) Foreign Application Priority Data

Mar. 21, 2007  (KR) .................. 10-2007-0027857
Sep. 12, 2007  (KR) .................. 10-2007-0092547

(51) Int. Cl.
- *H04W 4/00* (2009.01)
- *H04L 1/00* (2006.01)
- *H04L 5/00* (2006.01)
- *H04W 28/04* (2009.01)

(52) U.S. Cl.
CPC ............ *H04L 1/0039* (2013.01); *H04L 1/0004* (2013.01); *H04L 1/0038* (2013.01); *H04L 1/0046* (2013.01); *H04L 5/0007* (2013.01); *H04W 28/04* (2013.01)
USPC ........................................ 370/329

(58) Field of Classification Search
USPC .................... 370/329, 330; 455/450
See application file for complete search history.

(56) References Cited

U.S. PATENT DOCUMENTS

| | | | |
|---|---|---|---|
| 6,804,528 B1 | 10/2004 | Laroia et al. | |
| 7,386,030 B2* | 6/2008 | Asghar et al. | 375/142 |
| 2003/0039230 A1* | 2/2003 | Ostman et al. | 370/335 |
| 2004/0038691 A1* | 2/2004 | Shin | 455/466 |
| 2005/0117553 A1* | 6/2005 | Wang et al. | 370/338 |
| 2005/0195760 A1* | 9/2005 | Lee et al. | 370/312 |
| 2005/0243776 A1 | 11/2005 | Kawabata et al. | |
| 2005/0282528 A1* | 12/2005 | Charpentier et al. | 455/414.2 |
| 2006/0094478 A1* | 5/2006 | Kim et al. | 455/574 |
| 2006/0195576 A1* | 8/2006 | Rinne et al. | 709/226 |

(Continued)

FOREIGN PATENT DOCUMENTS

| | | |
|---|---|---|
| JP | 06-284075 | 10/1994 |
| WO | WO 2007/025138 | 3/2007 |

OTHER PUBLICATIONS

3GPP TSG RAN WG2#49 R2-052994; "Scheduling Support for Voice Services in E-UTRA"; Nov. 2005 (3 pages).*

*Primary Examiner* — Derrick Ferris
*Assistant Examiner* — Scott M Sciacca
(74) *Attorney, Agent, or Firm* — The Farrell Law Firm, P.C.

(57) ABSTRACT

A method and apparatus for receiving control information in a mobile communication system. A controller acquires information indicating variable Control Channel Elements (CCEs) allocated for first User Equipments (UEs) among CCEs constituting control channels, acquires information indicating fixed CCEs allocated for second UEs, selects the variable CCEs when a UE receiving the control information is included in the first UEs, and selects the fixed CCEs when the UE is included in the second UEs. A control information receiver receives the control information through the selected CCEs.

6 Claims, 15 Drawing Sheets

(56) References Cited

U.S. PATENT DOCUMENTS

| | | | |
|---|---|---|---|
| 2007/0070944 A1* | 3/2007 | Rinne et al. | 370/329 |
| 2007/0097901 A1* | 5/2007 | Tirkkonen et al. | 370/318 |
| 2007/0133479 A1* | 6/2007 | Montojo et al. | 370/335 |
| 2007/0189214 A1* | 8/2007 | Hyon et al. | 370/329 |
| 2007/0258540 A1* | 11/2007 | Ratasuk et al. | 375/267 |
| 2007/0265016 A1* | 11/2007 | Kahtava et al. | 455/452.2 |
| 2008/0160999 A1* | 7/2008 | Eklund | 455/436 |
| 2008/0170526 A1* | 7/2008 | Narang et al. | 370/311 |
| 2009/0040955 A1* | 2/2009 | Jung et al. | 370/311 |
| 2009/0180432 A1* | 7/2009 | Harada et al. | 370/329 |

\* cited by examiner

US 8,948,092 B2

METHOD AND APPARATUS FOR RECEIVING A CONTROL CHANNEL IN A MOBILE COMMUNICATION SYSTEM

PRIORITY

This application claims priority under 35 U.S.C. §119(a) of Korean Patent Applications filed in the Korean Intellectual Property Office on Mar. 21, 2007 and Sep. 12, 2007, and assigned Serial No. 2007-27857 and Serial No. 2007-92547, respectively, the contents of which are incorporated herein by reference.

BACKGROUND OF THE INVENTION

1. Field of the Invention

The present invention relates generally to a method and apparatus for receiving control information in a mobile communication system, and in particular, to a method and apparatus for receiving a control channel in an Orthogonal Frequency Division Multiplexing (OFDM) mobile communication system.

2. Description of the Related Art

OFDM, a scheme for transmitting data using multiple carriers, is a kind of Multi-Carrier Modulation (MCM) that converts a serial input symbol stream into parallel streams and modulates each of the streams with a plurality of orthogonal sub-carriers, i.e., sub-carrier channels, before transmission. Further, OFDM is actively being researched and applied in wireless communication systems.

FIG. 1 is a diagram illustrating an example of resource allocation in time and frequency domains in a conventional OFDM-based mobile communication system. In a conventional OFDM system, one modulation symbol (e.g., Quadrature Phase Shift Keying (QPSK) or 16-ary Quadrature Amplitude Modulation (16QAM)) is normally transmitted over one sub-carrier. Therefore, the sub-carriers are commonly considered as basic resources.

Referring to FIG. 1, the vertical axis 105 represents a time axis (or a time domain), and the horizontal axis 104 represents a frequency axis (or a frequency domain). Reference numeral 101 represents one sub-carrier, and reference numeral 102 presents one OFDM symbol. As illustrated in FIG. 1, one OFDM symbol is commonly composed of a plurality of sub-carriers. In addition, the common OFDM system unites a plurality of OFDM symbols into a basic transmission unit.

The basic transmission unit composed of several OFDM symbols will be referred to herein as a 'Transmission Time Interval (TTI)'. Therefore, as illustrated in FIG. 1, one TTI 107 is composed of a plurality of OFDM symbols. Further, a smallest unit 103 shown in FIG. 1 will be referred to as a 'Resource Element (RE)'. Thus, one TTI 107 includes a plurality of REs. In FIG. 1, one slot 106 is a basic unit constituting a physical channel, and RB 108 is a resource block, which is a basic unit in the frequency domain, constituting a data channel.

A Shared Control Channel (SCCH) is a channel that contains frequency resource information necessary for transmitting and receiving a Shared Data Channel (SDCH), Modulation and Coding Scheme (MCS) information, and Hybrid Automatic Repeat reQuest (HARQ) information. In the downlink, a terminal or User Equipment (UE) receives an SCCH to determine which frequency resources are used by an SDCH and in which format the SDCH is transmitted, in order to normally demodulate the corresponding SDCH. In the uplink, a UE reads an SCCH, and transmits an SDCH with the allocated frequency resources and format.

Because a SCCH is a channel that all UEs can receive on a shared basis, a base station performs UE IDentifier (ID)-specific Cyclic Redundancy Check (CRC) on the SCCH before transmission in order for a UE to determine whether the SCCH has been transmitted to the UE itself. Therefore, when a UE has received an SCCH from the base station, if the UE uses its own UE ID when performing CRC on the SCCH, the UE can determine if an SDCH valid to the UE itself has been scheduled.

SUMMARY OF THE INVENTION

The present invention has been designed to address at least the problems and/or disadvantages and to provide at least the advantages described below. Accordingly, an aspect of the present invention is to provide a method and apparatus for receiving a Shared Control Channel (SCCH) in an Orthogonal Frequency Division Multiple Access (OFDMA) system.

Another aspect of the present invention is to provide a method and apparatus for reducing blind detection of a receiver in an OFDMA system.

Another aspect of the present invention is to provide a method and apparatus in which UEs for transmitting/receiving normal packet data and Discontinuous Reception (DRx) UEs receive an SCCH in an OFDMA system.

Another aspect of the present invention is to provide an SCCH reception method and apparatus for receiving the data that is transmitted to the entire cell (all UEs in the cell) or a group of a plurality of UEs on a shared basis in an OFDMA system.

Another aspect of the present invention is to provide a method and apparatus in which UEs for transmitting/receiving normal packet data and UEs for receiving System Information (SI) receive an SCCH in an OFDMA system.

In accordance with an aspect of the present invention, a method is provided for receiving control information by a User Equipment (UE) in a mobile communication system. The method includes receiving information indicating variable Control Channel Elements (CCEs) allocated for first UEs among CCEs constituting control channels used in the system, and information indicating fixed CCEs allocated to be used for second UEs; selecting the variable CCEs when the UE is included in the first UEs; selecting the fixed CCEs when the UE is included in the second UEs; and receiving control information over a control channel including the selected variable CCEs or fixed CCEs.

In accordance with another aspect of the present invention, an apparatus is provided for receiving control information in a mobile communication system. The apparatus includes a controller for acquiring information indicating variable Control Channel Elements (CCEs) allocated to first User Equipments (UEs) among CCEs constituting control channels, and information indicating fixed CCEs allocated to be used for second UEs, selecting the variable CCEs when a UE receiving the control information is included in the first UEs, and selecting the fixed CCEs when the UE is included in the second UEs; and a control information receiver for receiving the control information through the CCEs selected by the controller.

In accordance with another aspect of the present invention, a method for receiving control information by a User Equipment (UE) in a mobile communication system is provided. The method includes determining if the UE should receive shared data or should receive non-shared data in the entire cell; selecting first subset information allocated to UEs receiving the shared data from among Control Channel Elements (CCEs) constituting control channels, when the UE should receive the shared data, and selecting second subset information allocated to UEs receiving the non-shared data from among the CCEs constituting control channels, when the UE should receive the non-shared data; and receiving the control information over a control channel corresponding to the selected first subset information or second subset information. The first subset information is control channel establishment information allocated to a UE receiving the shared data, and the second subset information is control channel establishment information allocated to a UE receiving the non-shared data.

In accordance with another aspect of the present invention, an apparatus for receiving control information in a mobile communication system is provided. The apparatus includes a controller for acquiring first subset information allocated to User Equipments (UEs) that should receive shared data in the entire cell from among Control Channel Elements (CCEs) constituting control channels, and second subset information allocated to UEs that should receive non-shared data, selecting the first subset information when a UE receiving the control information should receive the shared data, and selecting second subset information when the UE receiving the control information should receive the non-shared data; and a control information receiver for receiving the control information over a control channel corresponding to the selected first subset information or second subset information. The first subset information is control channel establishment information allocated to a UE receiving the shared data, and the second subset information is control channel establishment information allocated to a UE receiving the non-shared data.

In accordance with another aspect of the present invention, a method for receiving control information by a User Equipment (UE) in a mobile communication system is provided. The method includes receiving information indicating fixed Control Channel Elements (CCEs) allocated to first UEs that should receive shared data in the entire cell among CCEs constituting control channels used in the system, and information indicating variable CCEs or fixed CCEs allocated to second UEs that should receive non-shared data in the entire cell; determining if the UE should receive the shared data; selecting fixed CCEs allocated to be used for the first UEs when the UE should receive the shared data; selecting variable CCEs or fixed CCEs allocated to be used for the second UEs when the UE should receive the non-shared data; and receiving the control information over a control channel including the selected CCEs.

In accordance with another aspect of the present invention, an apparatus for receiving control information by a User Equipment (UE) in a mobile communication system is provided. The apparatus includes a controller for acquiring information indicating fixed Control Channel Elements (CCEs) allocated to first UEs that should receive shared data in the entire cell among CCEs constituting control channels used in the system, and information indicating variable CCEs or fixed CCEs allocated to second UEs that should receive non-shared data in the entire cell, selecting fixed CCEs allocated to be used for the first UEs when the UE should receive the shared data, and selecting variable CCEs or fixed CCEs allocated to be used for the second UEs when the UE should receive the non-shared data; and a control information receiver for receiving the control information through CCEs selected by the controller.

BRIEF DESCRIPTION OF THE DRAWINGS

The above and other aspects, features, and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will now be described in detail with reference to the annexed drawings. In the following description, a detailed description of known functions and configurations incorporated herein has been omitted for clarity and conciseness.

Before a description of the present invention is given, for a better understanding of the present invention, referring to FIG. 2, a method for defining a Shared Control Channel (SCCH) in an Orthogonal Frequency Division Multiplexing (OFDM) system to which the present invention is applied will be described.

Figure 1:
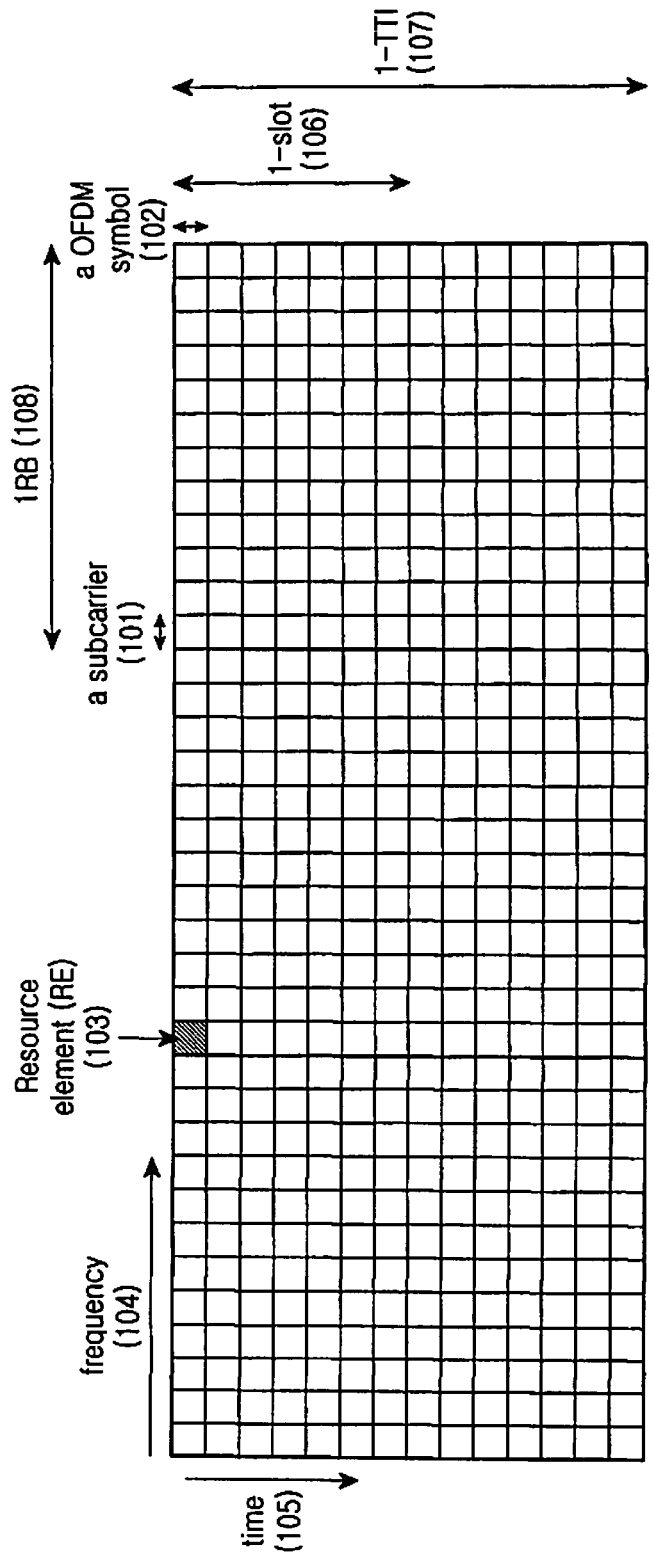
FIG. 1 is a diagram illustrating an example of resource allocation in time and frequency domains in a conventional OFDM-based mobile communication system.
Figure 2:
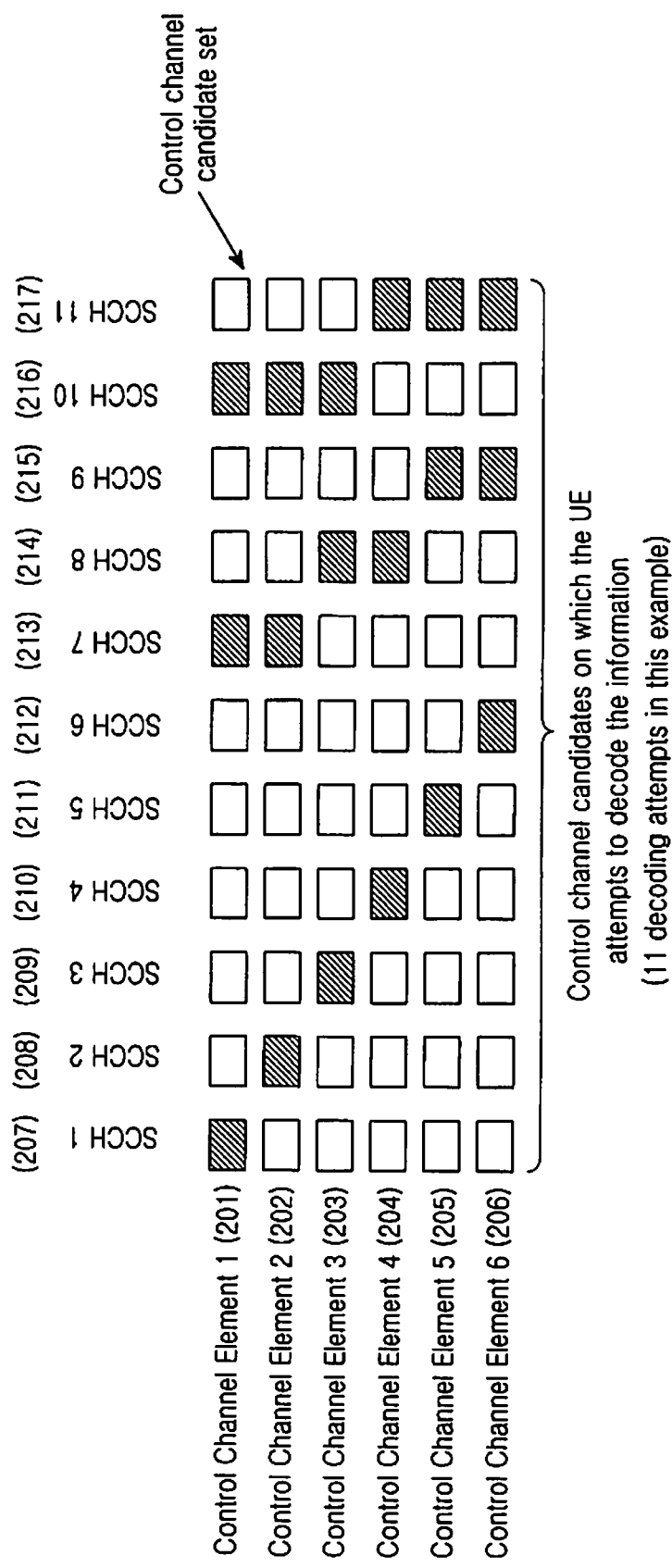
FIG. 2 is a diagram illustrating a method for creating an SCCH in an OFDM system to which the present invention is applied.

FIG. 2 is a diagram illustrating a method for creating an SCCH in an OFDM system to which the present invention is applied.

Control Channel Elements (CCEs) 201 through 206, which are transmission resources constituting control channels, are defined as basic units of an SCCH. Each CCE includes the same number of REs. The CCE will be used herein as transmission resources allocated for an SCCH.

An SCCH over which control information is transmitted is transmitted using the CCE, and the SCCH can include one CCE or a plurality of CCEs according to its format.

Referring to FIG. 2, SCCHs 207-212, i.e., SCCH1-SCCH6, are each transmitted using one CCE. SCCHs 213-215, i.e., SCCH7-SCCH9, are each transmitted with two CCEs. SCCHs 216 and 217, i.e., SCCH10-SCCH11, are each transmitted with three CCEs. When the same number of information bits are transmitted, bit transmission based on multiple CCEs can use more OFDM symbols compared to bit transmission based on one CCE, making it possible to use a lower Modulation and Coding rate Scheme (MCS) level for the transmission. That is, when the same amount of control information is transmitted, an MCS level for information transmission using three CCEs is lower than an MCS level for information transmission using one CCE. Therefore, in the mobile communication system, it can be more efficient to use an MCS level lower than the MCS level used for a UE in a good channel environment in order to transmit control information, while maintaining reliability for a UE in a poor channel environment.

When multiple CCEs are used in one cell and transmission of an SCCH including several combinations of CCEs is possible, a UE demodulates all CCEs to receive an SCCH transmitted to the UE itself, assuming that there are several types of SCCHs. If the UE succeeds in a CRC check, the UE can determine that there is an SCCH transmitted to the UE itself.

Because a receiver cannot know an MCS of an SCCH without knowing a position of a CCE when the SCCH is transmitted among all CCEs, the receiver should determine if there is an SCCH transmitted to the receiver itself through a CRC check on an SCCH transmission format (position of a CCE(s) used for SCCH transmission and combination of MCSs) available for receiving the SCCH. Such a process is called 'blind detection'.

For example, CCE1 201 is used for transmission of SCCH1 207 and also for transmission of SCCH7 213 and SCCH10 216. Therefore, a UE should make a demodulation attempt on SCCH1 207 using CCE1 201, make a demodulation attempt on SCCH7 213 using CCE1 201 and CCE2 202 to acquire information indicating if SCCH7 213 has been transmitted using CCE1 201 and CCE2 202, and make a demodulation attempt on SCCH10 216 using CCE1-CCE3 201-203 to acquire information indicating if SCCH10 216 has been transmitted using CCE1-CCE3 201-203.

Consequently, the number of blind detections that the UE should perform increases with the number of CCEs and available MCS levels. Further, the time and complexity needed at the receiver increases with the number of blind detections, which increases the time required for sending an HARQ response after receiving packet data.

The number of CCEs available in one cell can be variably set according to a cell load of a base station and/or the number of scheduled UEs. Because it is possible to define the variably available CCEs in this way and it is possible to use, for data transmission, the remaining frequency resources, except for the CCE resources in use among the entire system resources, resource utilization is fairly efficient.

In order to establish a variable CCE(s), a base station notifies a UE of the number Ncce of CCEs used by the base station among the entire frequency resources within a Transmission Time Interval (TTI). The UE determines the amount of frequency resources used for the CCE depending on the Ncce and can use the remaining frequency resources for data transmission.

The Ncce information should be transmitted to the entire cell (i.e., all UEs in the cell) or scheduled UEs so that UEs desiring to receive an SCCH signal can get the information. Although it is preferable to differently set the number of desired CCEs every TTI in terms of the resource efficiency, it is also possible to signal the Ncce information at the longer period rather than every TTI, taking signaling overhead into account.

In the OFDM system to which the present invention is applied, SCCH is generally used only when normal packet data is transmitted every scheduling period, i.e. every TTI. In addition, however, an SCCH can be used to enable even the UEs now performing a Discontinuous Reception (DRx) operation to receive an SCCH signal when they wake up from a sleep mode, and determine if there is any data transmitted to the UEs themselves. Herein, the terms 'control information reception over SCCH' and 'SCCH signal reception' will be used in the same meaning as 'SCCH reception'.

Also, an SDCH can be used for transmission of System Information (SI). In this case, a UE receiving SI can also receive an SDCH signal on which SI is transmitted, by receiving an SCCH signal. However, because the SCCH is different from the normal packet data in terms of the characteristic and reception method, there is a need to establish an SCCH considering the difference.

A brief description will now be made of how an SCCH is different from the normal packet data in terms of the characteristic and reception method.

First, a UE operating in a DRx mode (DRx-mode UE) is different from a UE transmitting/receiving normal packet data in that the DRx-mode UE, rather than receiving an SCCH signal every TTI, periodically wakes up from the sleep mode and receives an SCCH signal. The UE operating in the DRx mode will be referred to herein as a 'DRx-mode UE' or 'DRx UE'.

Figure 3:
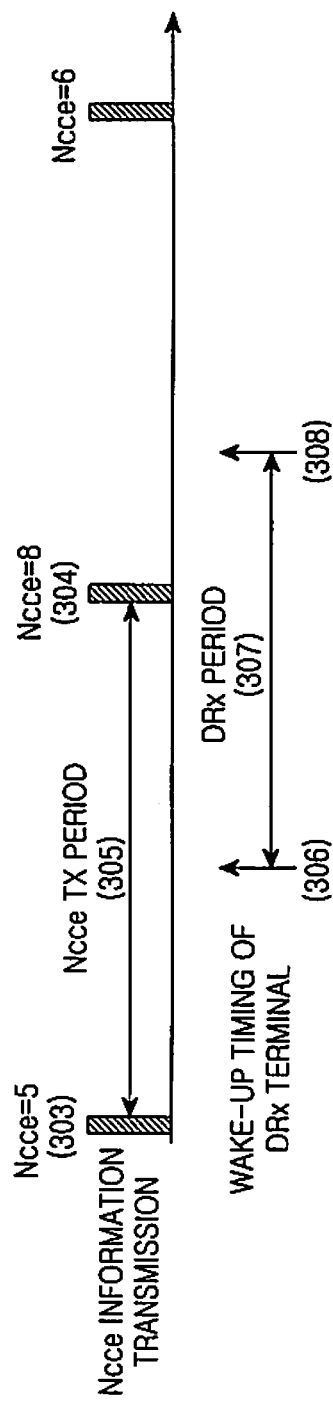
FIG. 3 is a diagram illustrating the problems occurring when a DRx UE receives SCCH in an OFDM system to which the present invention is applied.

FIG. 3 is a diagram illustrating problems occurring when a DRx UE receives SCCH in an OFDM system to which the present invention is applied. As can be seen in FIG. 3, a DRx UE wakes up at a predetermined period 307 (at timings 306 and 308) rather than every TTI, and receives an SCCH. Ncce information is transmitted with a longer period 305 (at timings 303 and 304), rather than being signaled every TTI. If the DRx UE wakes up and receives SCCH at the timings 306 and 308, the timings 306 and 308 where the DRx UE wakes up and receives SCCH do not coincide with the timings 303 and 304, where Ncce information is transmitted, such that the Ncce information is invalid for the DRx UE.

Because a UE should acquire Ncce information in order to determine the number of CCEs actually allocated, the UE may demodulate an SCCH by performing blind detection. However, a DRx-mode UE may have difficulty in normally receiving an SCCH, because the Ncce information is invalid as described above.

As to the second difference, when data such as SI is transmitted in common to all UEs in the cell, a channel should be established such that all or multiple UEs in the cell can all receive the data, unlike the UEs transmitting/receiving normal packet data. In the OFDM system to which the present invention is applied, because SCCH transmission can use a plurality of CCEs and various MCS levels as described above, it is preferable to enable the base station to determine a format of the transmission SCCH based on the channel state of each UE, thereby enabling efficient resource utilization. As a result, however, the number of blind detections may increase, causing an increase in the reception time and complexity.

However, it is common that data such as SI, transmitted in common to all UEs in the cell, is transmitted with a lower MCS level, because it is transmitted to all UEs. Therefore, the receiver may unnecessarily perform blind detection because it has no need to create an SCCH considering several MCS levels like the SCCH for packet data transmission.

As to the third difference, when information such as SI, commonly necessary for all UEs in the cell, is transmitted over an SDCH, because a UE desiring to receive the information by first accessing the cell cannot acquire information on a control channel of the cell, unlike the UE which has already received SI, it should perform different SCCH reception from that of the normal-mode UE. That is, among the REs allocated for a control channel, the remaining REs except for the control channel, such as REs allocated for a pilot and REs allocated for transmission of downlink ACKnowledge/Not-ACKnowledge (ACK/NACK) CCEs, are used as REs for CCEs transmitting SCCH. While a position of the RE allocated for a pilot is fixed, the RE for downlink ACK/NACK CCE may vary according to the number of channels that each cell desires to use.

More specifically, the REs used for CCE transmission are variable in position according to the amount of ACK/NACK resources. Accordingly, because a UE desiring to demodulate an SCCH in order to receive a Broadcast Channel (BCH) has no information on the amount of resources allocated for ACK/NACK transmission, it cannot correctly know a position of the RE transmitting CCE, making it difficult to normally receive the SCCH. Therefore, the UE needs a different SCCH reception operation from that of the normal-mode UE.

Preferred embodiments of the present invention provide methods and apparatuses for receiving an SCCH. Further, the preferred embodiments of the present invention provide methods and apparatuses for establishing an SCCH differently for a normal case where the UE receives packet data and a special case where the UE receives SI in a DRx mode.

While UEs transmitting/receiving normal packet data demodulate/receive SCCH through variable CCEs, DRx UEs demodulate/receive SCCH through fixed CCEs.

Although descriptions of the embodiments below will be made for downlink SDCH reception, the same channel structure and UE's SCCH reception operation can be applied to uplink SCCH reception.

Figure 4:
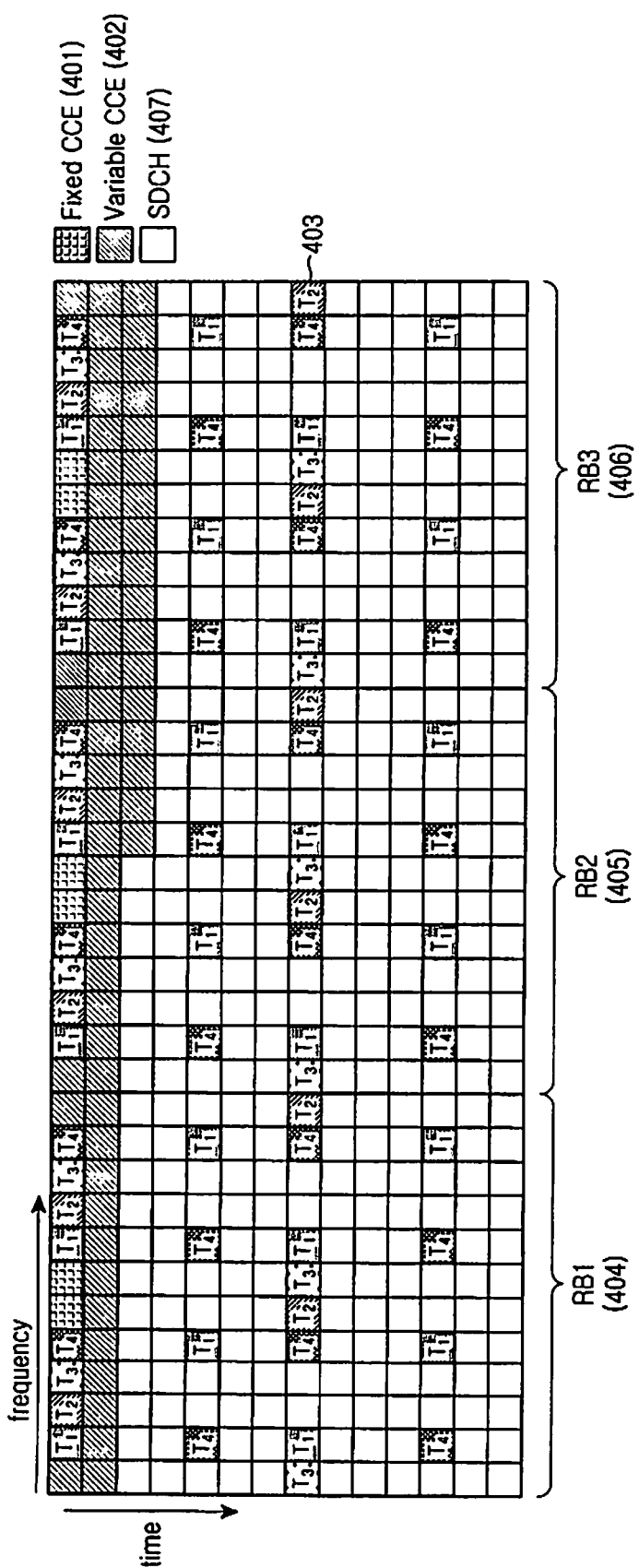
FIG. 4 is a diagram illustrating a structure for SCCH channel establishment according to an embodiment of the present invention.

FIG. 4 is a diagram illustrating a structure for SCCH channel establishment according to an embodiment of the present invention. It is assumed in FIG. 4 that SCCH is transmitted in only the first three OFDM symbols within the TTI. The total number Ncce of CCEs transmitting SCCH is variable, and this information is signaled every TTI, which is greater than 1. Herein, the entire SDCH can transmit data after all the CCEs. It is noted in FIG. 4 that RBs 404, 405, and 406 are different from each other in the position of a start OFDM symbol of an SDCH. Because the number Ncce of CCEs is variable, the position of a start OFDM symbol of an SDCH is changeable according to the Ncce.

Most notably in FIG. 4, in transmitting the SCCH, two types of CCE regions are classified as fixed CCEs 401 and variable CCEs 402. The variable CCE 402 is a CCE for transmitting an SCCH for transmission of normal packet data.

The total number of CCEs depends upon a value of Ncce. A position of an actual RE occupied by one CCE is also differently determined according to the total number Ncce of CCEs.

The variable CCE 402 has been defined to obtain the maximum diversity effect by dispersing positions of REs transmitting one CCE in the frequency domain occupied by all CCEs available in the cell. In FIG. 4, a plurality of unit CCEs are transmitted in the region of the variable CCE 402. In FIG. 4, T1, T2, T3, and T4 are resources where reference symbols of an antenna 1, an antenna 2, an antenna 3, and an antenna 4 are transmitted, respectively.

In FIG. 4, the fixed CCE 401 includes REs represented by reference numeral 401, and is defined such that it always occupies fixed REs, without being affected by Ncce or downlink ACK/NACK resources. The reason for introducing the fixed CCE 401 regardless of the Ncce value is as follows. When the Ncce value is not transmitted every TTI and when the timing for a DRx-mode UE wake up is different from the timing when the Ncce is signaled, the DRx-mode UE cannot receive the variable CCE 402 as it does not receive the Ncce value, so there is a need for a CCE always located in the fixed RE regardless of the Ncce value, for such a DRx-mode UE.

Figure 6:
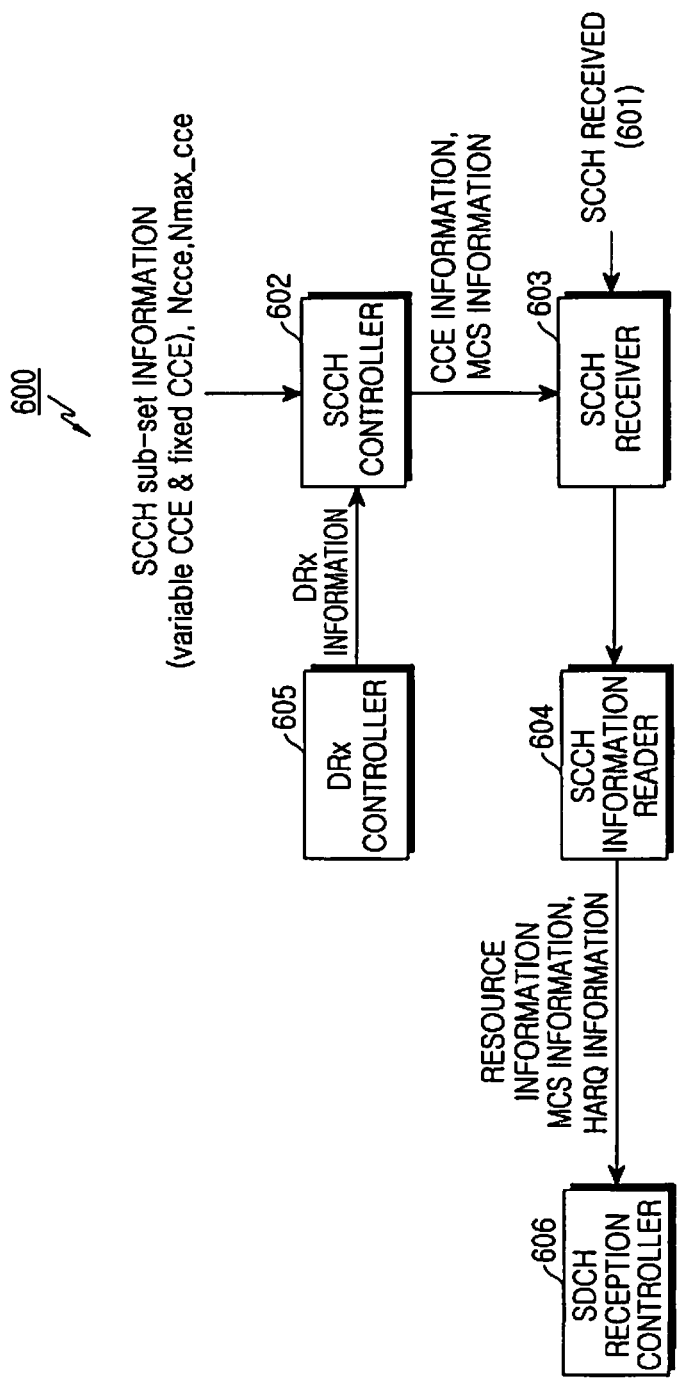
FIG. 6 is a block diagram illustrating a structure of a UE for receiving SDCH according to an embodiment of the present invention.

Because SDCH is used from an OFDM symbol (from a third OFDM symbol when the CCE occupies, for example, three OFDM symbols) where the entire CCE terminates, among the OFDM symbols used in the OFDM system, if the fixed CCE 401 ranges over several OFDM symbols, it is preferable to position the fixed CCE 401 in a first OFDM symbol in order to eliminate the possibility that SDCH 407 cannot be used due to the fixed CCE 401 even though the variable CCE 402 terminates at the first or second OFDM symbol. Information on the positions of and the number of the above defined fixed CCEs and variable CCEs can be provided through SCCH subset information as illustrated in FIG. 6 and Table 1.

Regarding establishment information for the SCCH that a UE receives in the general case, it is possible to directly establish SCCH channel information through subset information among all SCCHs, or to establish SCCH channel information by providing CCE information and MCS information. The term 'subset' as used herein refers to SCCHs the UE should receive among all the SCCHs used in the cell.

When a UE operates in the DRx mode, the base station provides the UE with fixed CCE information (positions of fixed CCEs) and MCS information (the number of fixed CCEs constituting SCCH) so that the UE can receive SCCH using the fixed CCEs 401.

In Table 1, CCE information represents positions of CCEs transmitting SCCH, and MCS information represents the number of CCEs constituting SCCH. The SCCH information, fixed CCE information, variable CCE information, and MCS information can be previously provided by upper layer signaling, or can be previously defined in the specification.

Table 1 shows an example of establishing SCCH according to an embodiment of the present invention.

TABLE 1

| Case | Establishment Information |
| --- | --- |
| Normal mode | SCCH subset A = (SCCH #1, #2, #3, #4, #5, #6, #7, #8, #9, #10) or SCCH subset A = ((CCE (#1, #2, #3, #4, #5, #6), MCS (1, 2, 3)) |
| DRx mode | SCCH subset B = (SCCH #7, #10) or SCCH subset B = ((CCE (#1, #2, #3), MCS (2, 3)) |

In Table 1, the SCCH subset A and the SCCH subset B indicate an SCCH over which control information is transmitted, or indicating CCEs constituting an SCCH over which control information is transmitted. For example, in Table 1, regarding the SCCH subset A, which is SCCH establishment information received when a UE is in a normal mode, i.e., not in the DRx mode, the UE can be provided, from the SCCH subset A, with the information notifying transmission of control information over SCCH #1, #2, #3, #4, #5, #6, #7, #8, #9, and #10, and it can be understood that SCCH is transmitted and used in CCE #1 CCE #6 from among all CCEs included in the SCCH, and one SCCH is includes 1, 2, or 3 CCEs.

Figure 5:
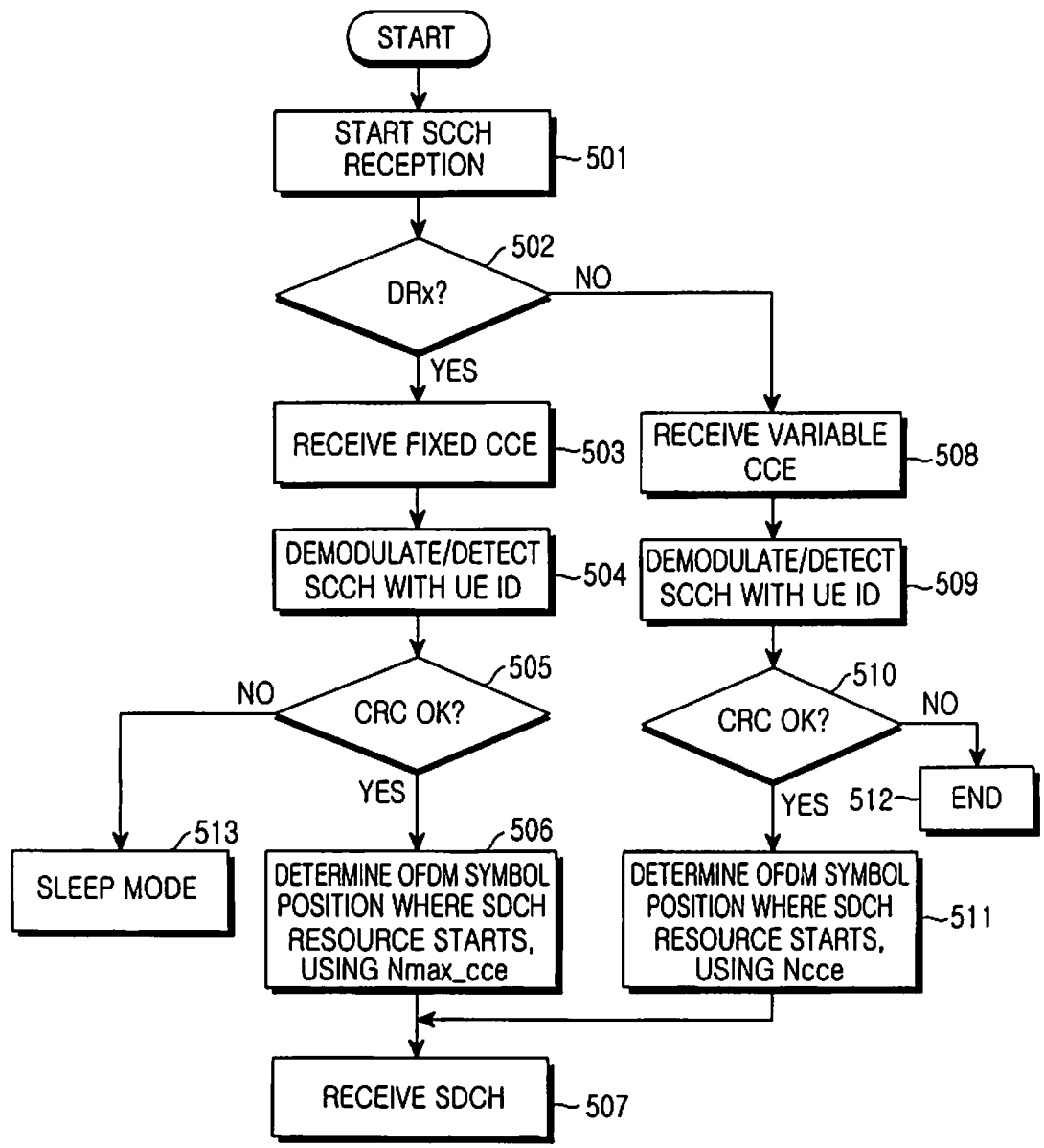
FIG. 5 is a flowchart illustrating a UE's SCCH reception operation according to an embodiment of the present invention.

FIG. 5 is a flowchart illustrating a UE's SCCH reception operation according to an embodiment of the present invention.

Referring to FIG. 5, when starting SCCH reception in step 501, a UE determines in step 502 if it has received an SCCH in the DRx mode. If it is determined in step 502 that the UE is in the DRx mode, the UE receives an SCCH signal that transmits control information over a fixed CCE, in step 503, and attempts SCCH demodulation on the received SCCH signal with its own IDentifier (ID) in step 504.

After demodulating and detecting SCCH with its own UE ID in step 504, the UE performs CRC on the detected SCCH in step 505, and if the UE has succeed in the CRC check, the UE determines positions and the amount of resources to attempt SDCH reception using information on the resources allocated to the SCCH, in step 506, because the detected SCCH is its own SCCH.

As described above in the channel structure, the position of a start OFDM symbol of an SDCH changes according to the total number of CCEs, and in this case, a DRx-mode UE, because it cannot know the Ncce, determines the position of a start OFDM symbol of SDCH resources based on the maximum possible number Nmax_cce of CCEs. For example, if Nmax_cce is 20, a $21^{st}$ CCE is a start OFDM symbol's position of SDCH resources. Nmax_cce can be previously defined in the specification, or can be previously set by upper layer signaling.

After determining the correct number of and positions of REs where an SDCH is transmitted in step 506, the UE receives the SDCH in step 507, using the SCCH information (control information) acquired in step 506. However, if it is determined in step 505 that the CRC check is failed, the UE returns back to the sleep mode in step 513. The term 'sleep mode' as used herein means an operation in which the UE periodically wakes up to receive SCCH in the DRx mode, and receives no SCCH in the other period.

If it is determined in step 502 that the UE is not in the DRx mode, the UE receives an SCCH signal through variable CCEs determined based on Ncce information in step 508. After receiving the SCCH signal transmitting control information through variable CCEs in step 508, the UE demodulates and detects SCCH for the received SCCH signal using its own UE ID in step 509.

In step 510, the UE performs CRC check on the detected SCCH, and if the UE has succeed in the CRC check, the UE determines a position of an OFDM symbol where SDCH starts based on Ncce information, in step 511, because the UE can perceive the presence of SCCH transmitted to the UE itself. Thereafter, in step 507, the UE receives SDCH. For reference, if the wake-up timing coincides with the Ncce transmission timing, it is also possible to set the DRx-mode UE to perform the same SCCH reception procedure as that of the normal-mode UE.

If it is determined in step 510 that the CRC check result is 'bad', the UE ends the SCCH reception operation without performing any operation since there is no SCCH transmitted to the UE itself.

FIG. 6 is a block diagram illustrating a structure of a UE 600 for receiving SDCH according to an embodiment of the present invention. Referring to FIG. 6, an SCCH receiver 603 receives SCCH 601 transmitted from an undepicted transmitter, and should perform blind detection in order to receive SCCH 601. To perform the blind detection, the SCCH receiver 603 receives CCE information and MCS information from an SCCH controller 602.

The SCCH controller 602 receives, from a DRx controller 605, DRx information indicating if the UE is in the DRx mode in order to determine the correct CCE information and MCS information that the SCCH receiver 603 needs for receiving SCCH. The SCCH controller 602 selects variable CCEs and fixed CCEs according to the DRx information received from the DRx controller 605, and receives, from upper layer signaling, establishment information for the SCCH over which control information such as the SCCH subset information, Ncce, and Nmax_cce is transmitted.

The SCCH controller 602 generates CCE information and MCS information for receiving SCCH, based on DRx information received from the DRx controller 605 and SCCH subset information, i.e., variable CCE information and fixed CCE information previously provided from upper layer signaling, and provides the generated information to the SCCH receiver 603.

An SCCH information reader 604 reads SCCH information for receiving SDCH, from the SCCH received by the SCCH receiver 603, and transfers the read SCCH information, such as resource information, MCS information, and HARQ information, to an SDCH reception controller 606. The SDCH reception controller 606, which has received the SCCH information read by the SCCH information reader 604, receives SDCH using the SCCH information.

DRx-mode UEs perform SCCH demodulation by receiving a fixed control channel using a different SCCH subset from the SCCH subset that the UEs performing normal packet data transmission/reception receive.

Although descriptions of embodiments of the present invention will be given below for downlink SDCH reception, the same channel structure and UE's SCCH reception operation can be applied even to uplink SCCH reception.

Figure 7:
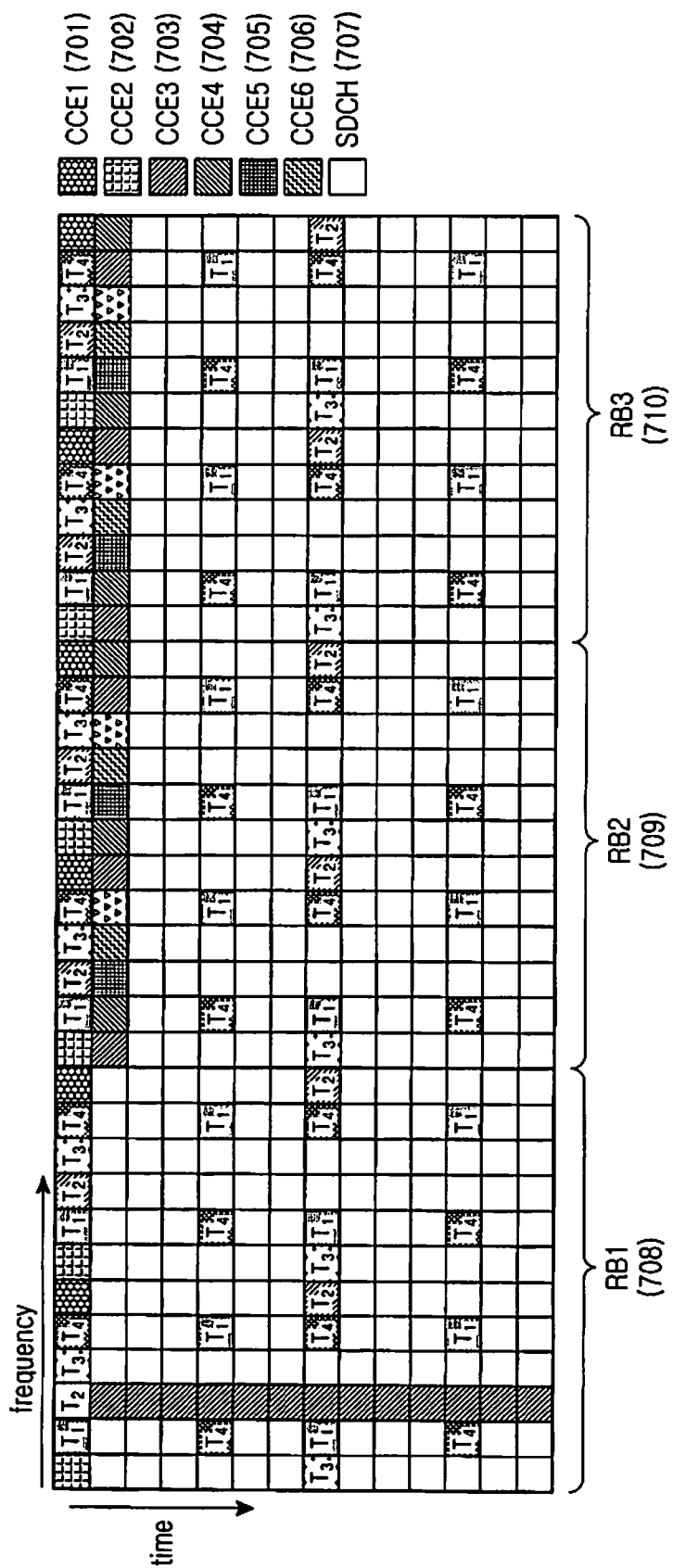
FIG. 7 is a diagram illustrating a structure for SCCH channel establishment according to an embodiment of the present invention.

FIG. 7 is a diagram illustrating a structure for SCCH channel establishment according to an embodiment of the present invention.

The SCCH channel according to the embodiment of the present invention described below is similar in structure to the SCCH channel based on the embodiment of the present invention described above, except that actual REs where unit CCEs constituting the SCCH are transmitted are positioned regardless of the Ncce. More specifically, in FIG. 7, RE positions of CCE1 701 through CCE6 706 are fixed, and the REs that are available in the system according to the Ncce can be used as REs where SCCH is transmitted, or REs for SDCH.

In this structure, the DRx UE has no problem in locating positions of CCEs even though it fails to receive Ncce by signaling.

Unfortunately, however, the DRx UE still cannot correctly determine which CCE it should receive. That is, the DRx UE cannot determine if it should receive CCE1 701-CCE6 706 or if it should receive CCE1 701-CCE4 704, unless it correctly receives Ncce. Therefore, the present invention provides a method and apparatus for defining the minimum number of transmittable CCEs (or SCCHs) so that DRx-mode UEs can normally receive SCCH in the SCCH structure illustrated in FIG. 7.

For example, the DRx-mode UE is set to receive only the CCE1 701. In this context, if one cell can use a total of 8 CCEs, a value of Ncce can be variably set to 1-8. However, it is common that one cell continuously uses at least one CCE. Therefore, if the CCE information, the number of CCEs transmitted every TTI, is signaled on a minimum basis, the DRx UE can normally receive CCEs and demodulate SCCH even without the Ncce information. Because it is assumed that the CCE is continuously transmitted, the CCE transmitted in the first OFDM symbol will generally be used as a fixed CCE. With reference to Table 2, a description will be made of an example of establishing an SCCH that a UE should receive in the SCCH structure according to an embodiment of the present invention.

It is possible to set some of the SCCHs as subset information, or provide information on CCEs the UE should receive and MCS information. By defining the information being set in the general case as SCCH subset A, the base station provides SCCH information the UE should receive among all available SCCHs. For the DRx-mode UE, the base station sets SCCH subset B so that the DRx-mode UE can receive the minimum number of CCEs.

It can be seen that for the DRx-mode UE, SCCH subset B is made, which includes SCCHs, the number of which is less than the number of SCCHs included in SCCH subset A used in the general case. The subset information of SCCH subset A and SCCH subset B is previously provided by upper layer signaling.

Table 2 shows an example of establishing SCCH according to an embodiment of the present invention.

TABLE 2

| Case | Establishment Information |
| --- | --- |
| Normal Mode | SCCH subset A = (SCCH #1, #2, #3, #4, #5, #6, #7, #8, #9, #10) or SCCH subset A = ((CCE (#1, #2, #3, #4, #5, #6), MCS (1, 2, 3)) |
| DRx mode | SCCH subset B = (SCCH #7, #10) or SCCH subset B = ((CCE (#1, #2, #3), MCS (2, 3)) |

Figure 8:
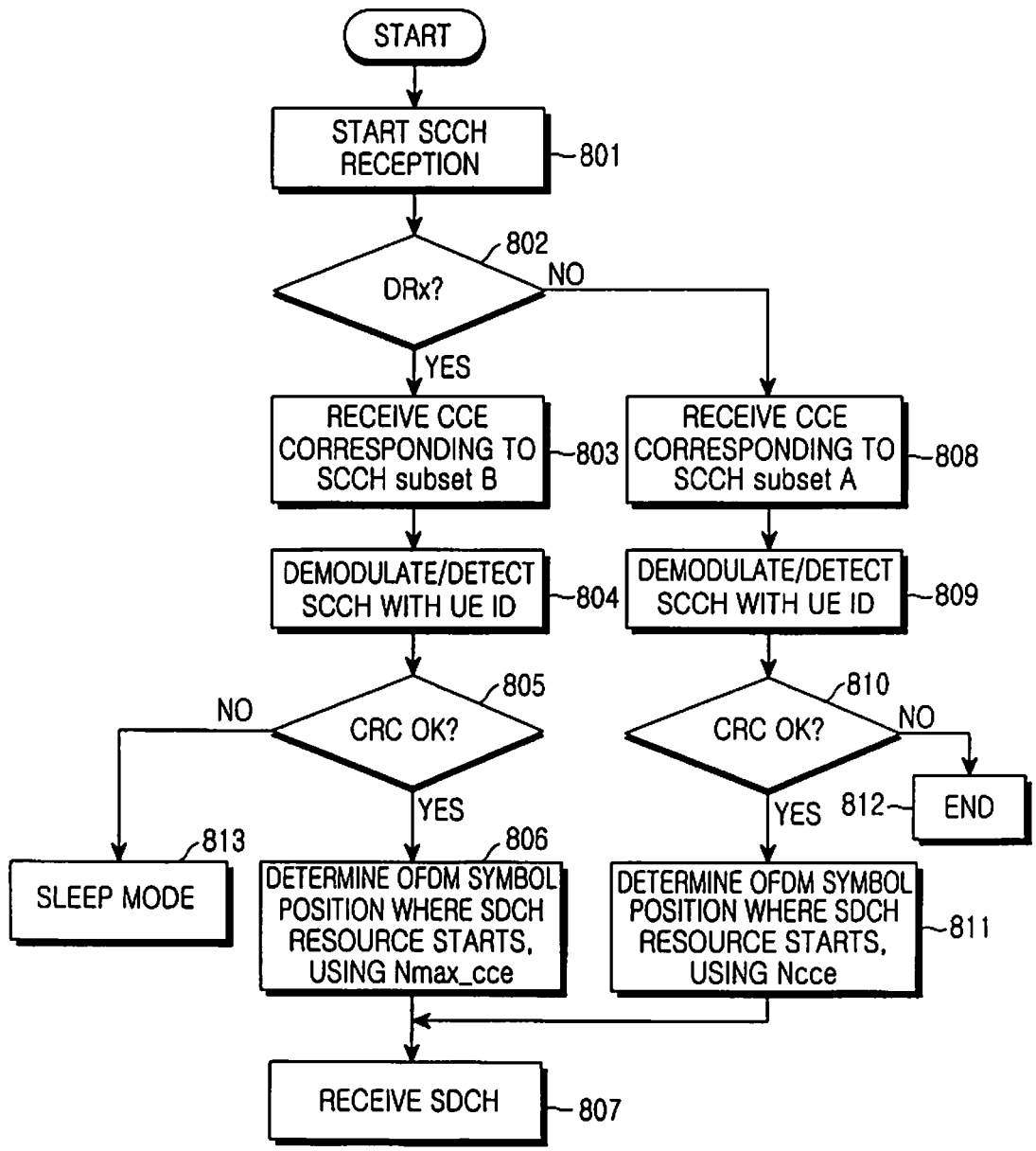
FIG. 8 is a flowchart illustrating a UE's SCCH reception operation according to an embodiment of the present invention.

FIG. 8 is a flowchart illustrating a UE's SCCH reception operation according to an embodiment of the present invention.

Referring to FIG. 8, after starting SCCH reception in step 801, a UE determines in step 802 if it should wake up to receive SCCH in the DRx mode. That is, the UE determines if the current SCCH reception operation is an SCCH reception operation performed in the wake-up timing in the DRx mode, or an SCCH reception operation performed in the normal scheduling mode.

If it is determined in step 802 that the UE is in the DRx mode, the UE receives an SCCH signal including control information through CCEs corresponding to SCCH subset B, which is SCCH establishment information for the DRx mode, in step 803. After receiving an SCCH signal through CCEs corresponding to SCCH subset B in step 803, the UE performs SCCH demodulation and detection on the received SCCH signal with its own UE ID in step 804.

Thereafter, the UE performs CRC check on the detected SCCH in step 805, and if the UE has succeed in the CRC check, in step 806, the UE determines a position of a start OFDM symbol of SDCH resources using Nmax_cce because the corresponding SCCH is SCCH transmitted to the UE itself. Thereafter, the UE receives SDCH in step 807. At this point, the UE, as it does not know the Ncce, also determines the start OFDM symbol of SDCH depending on the maximum number Nmax_cce of establishable CCEs, and calculates the correct amount of and positions of SDCH resources using the information on the resources allocated in SCCH together. Nmax_cce can be previously defined, or can be previously set by upper layer signaling. However, if it is determined in step 805 that the UE has failed in the CRC check, the UE enters the sleep mode in step 813.

If it is determined in step 802 that the UE is not in the DRx mode, the UE receives CCEs corresponding to information of SCCH subset A which is SCCH establishment information for a non-DRx-mode UE, i.e., a normal-mode UE, in step 808.

Thereafter, in step 809, the UE performs SCCH demodulation on the received SCCH signal with its own UE ID. In step 810, the UE performs CRC check on the demodulated SCCH, and if the UE succeeds in the CRC check, in step 811, the UE calculates the amount of and positions of SDCH resources based on the position of the start OFDM symbol where SDCH starts, determined using the allocated resource information and Ncce information signaled over SCCH. Thereafter, in step 807, the UE receives the SDCH using the amount of and positions of SDCH resources, calculated in step 811. However, if it is determined in step 810 that the UE fails in the CRC check, the UE ends the SCCH reception operation in step 812.

For reference, if the wake-up timing coincides with the Ncce transmission timing, it is also possible to set even the DRx-mode UE so as to perform the same SCCH reception as that of the normal-mode UE.

Figure 9:
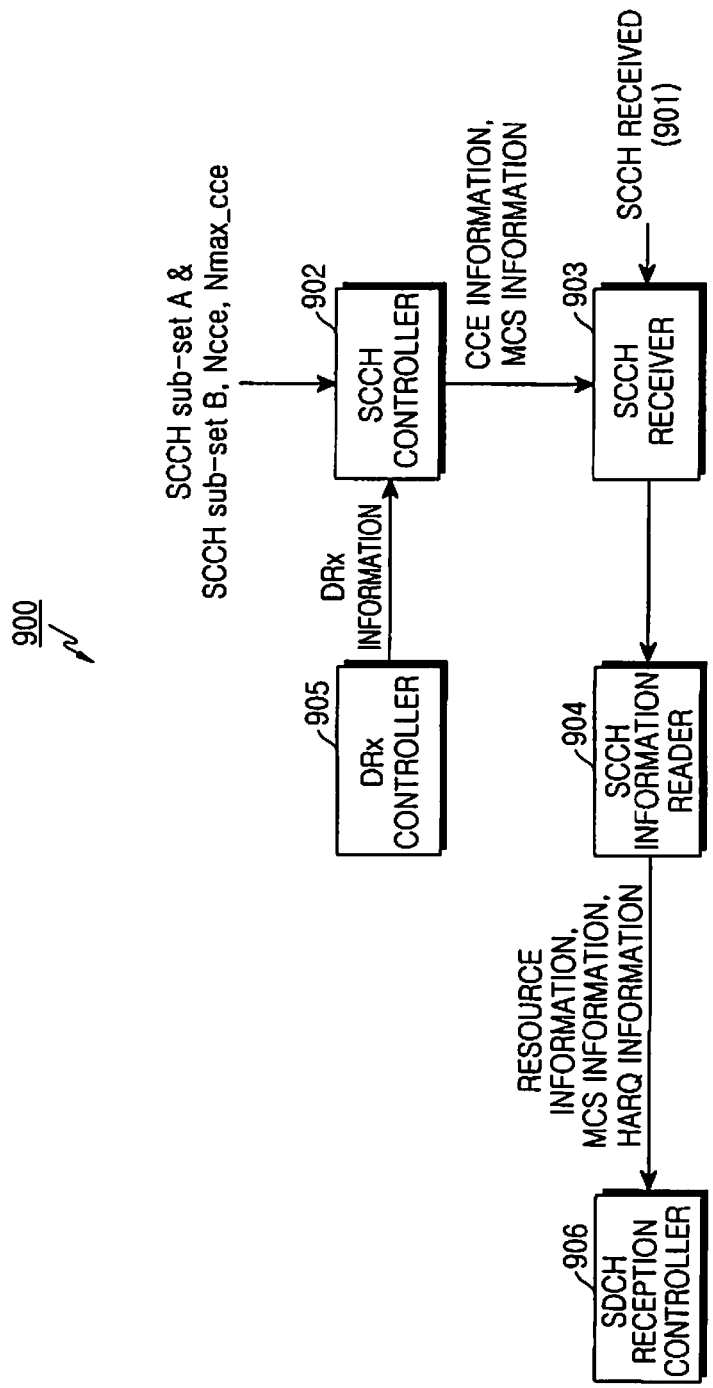
FIG. 9 is a block diagram illustrating a structure of a UE for receiving SDCH according to an embodiment of the present invention.

FIG. 9 is a block diagram illustrating a structure of a UE 900 for receiving SDCH according to an embodiment of the present invention. Referring to FIG. 9, an SCCH receiver 903 receives an SCCH, and an SCCH information reader 904 reads the SCCH information received by the SCCH receiver 903 and transfers, to an SDCH reception controller 906, resource information, MCS information, and HARQ information used for receiving SDCH. The SDCH reception controller 906 receives an SDCH based on the information provided by the SCCH information reader 904.

The SCCH receiver 903 should perform blind detection in order to receive SCCH. For this purpose, the SCCH receiver 903 should receive CCE information and MCS information. The CCE information and MCS information are provided from an SCCH controller 902, and the SCCH controller 902 receives, from a DRx controller 905, DRx information indicating whether the UE 900 is in the DRx mode or not, in order to detect the correct CCE information and MCS information.

The SCCH controller 902 generates CCE information and MCS information for receiving SCCH, using SCCH subset A and SCCH subset B, which are DRx information received from the DRx controller 905 and SCCH establishment information previously signaled from upper layer signaling. That is, when the UE 900 is in the DRx mode, the SCCH controller 902 generates CCE information and MCS information corresponding to SCCH subset B, and when the UE 900 is in the normal mode, the SCCH controller 902 generates CCE information and MCS information corresponding to SCCH subset A.

When receiving the data transmitted in common to the entire cell or a group of UEs, UEs receive a control channel to perform SCCH demodulation, using an SCCH subset different from the SCCH subset that UEs performing normal packet data transmission/reception receive. Because the largest one of the data transmitted in common to the entire cell or a group of UEs is generally SI of the cell, an operation of receiving SI over SDCH by a UE will be referred to herein as an operation of receiving SI, for short.

The channel structures of the present invention as described above are available as the channel structure used for preferred implementation of SCCH according to another embodiment of the present invention. That is, as the basic CCEs are dispersed over the entire CCE region, the SCCH implementation is possible both in the structure where the position of the occupied RE is changed according to Ncce, and in the structure where the position of the RE where the basic CCE (one CCE) is transmitted is fixed.

As described above, it is common that for transmission of SI, the base station selects the lowest possible MCS level for transmission of control information, considering the UE in the worst channel environment and/or the UE located in the cell boundary such that all UEs in the cell or a group of UEs can receive the control information. More specifically, even when several possible MCS levels are set to efficiently manage SCCH, one or two MCS levels will be enough for SCCH available for transmission of SI. Herein, MCS is used as the same expression as the number of CCEs constituting SCCH. Therefore, for SI reception, an embodiment of the present invention described below provides an SCCH subset different from the SCCH subset for receiving control information necessary for receiving SDCH over which normal packet data is transmitted.

It is preferable that an SCCH subset for SI reception includes the smaller MCS combination or the fewest number of CCEs, compared to the normal SCCH subset including information on the control channel for the non-shared data other than shared data such as SI. Therefore, application of the foregoing proposal can reduce the number of blind detections.

Next, with reference to Table 3, a description will be made of an example of establishing SCCH that the UE should receive in the SCCH structure according to an embodiment of the present invention. It is possible to establish SCCH allocated to a UE among all SCCHs using a subset, or to provide information on the CCE that the UE should receive and MCS information. The information being set for the normal case where non-shared data is received is defined as SCCH subset A, and SCCH information that the UE should receive among all SCCHs used in the cell is provided through the SCCH subset A. In the embodiment of the present invention described below, establishment information of SCCH which is a control channel for transmitting control information will be referred to as an SCCH subset, and the establishment information includes a unique number of SCCH transmitting control information, and the number of and positions of CCEs constituting SCCH.

SCCH subset B is set for SI reception. In order to reduce the blind detection complexity, an SCCH subset is set, which includes SCCHs, the number of which is less than the number of SCCHs used in the general case.

Table 3 shows an example of establishing SCCH according to an embodiment of the present invention.

TABLE 3

| Case | Establishment Information |
| --- | --- |
| Normal reception | SCCH subset A = (SCCH #1, #2, #3, #4, #5, #6, #7, #8, #9, #10) or SCCH subset A = ((CCE (#1, #2, #3, #4, #5, #6), MCS (1, 2, 3)) |
| SI reception | SCCH subset B = (SCCH #7, #10) or SCCH subset B = ((CCE (#1, #2, #3), MCS (2, 3)) |

Figure 10:
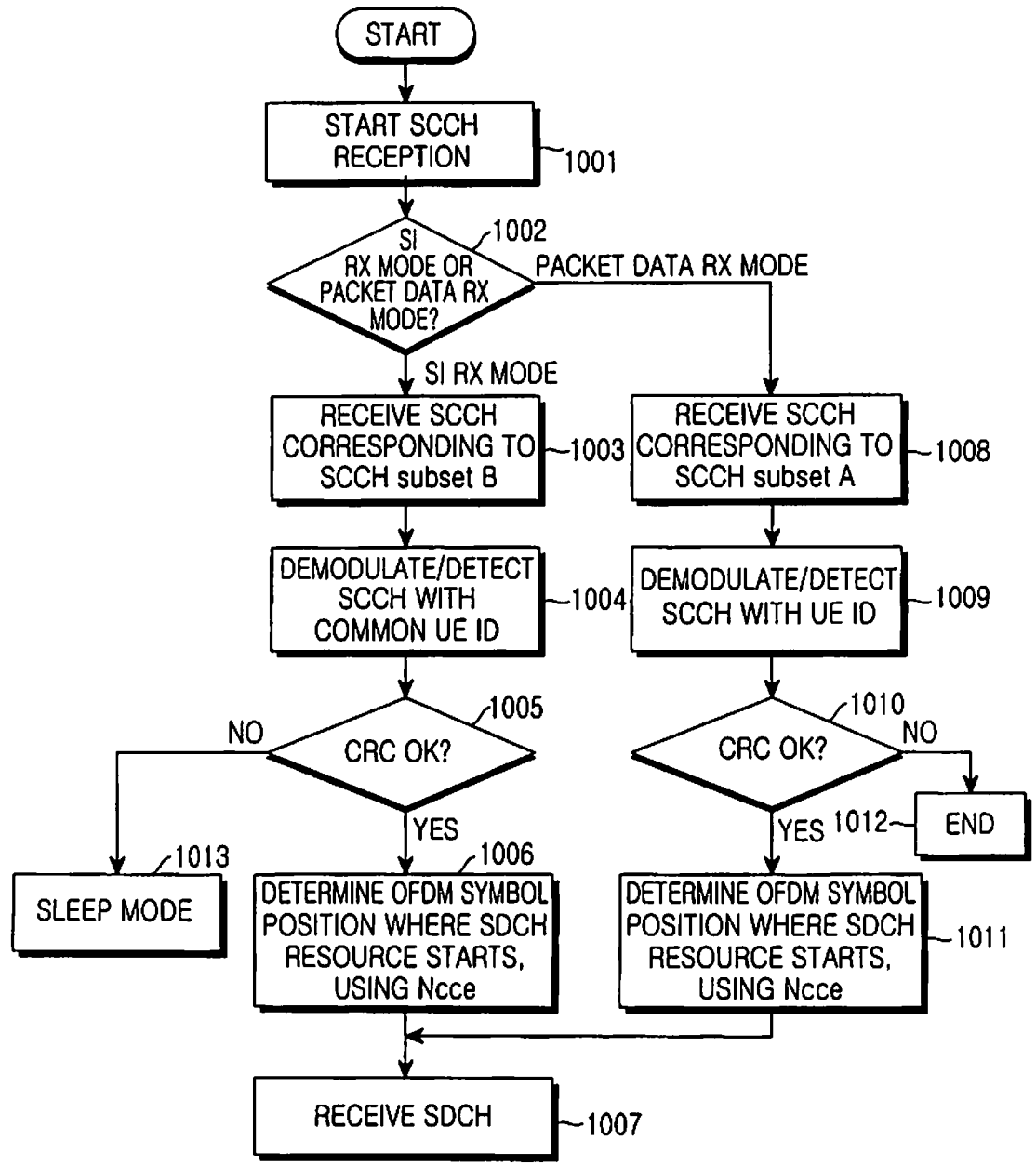
FIG. 10 is a flowchart illustrating an UE's SCCH reception operation according to an embodiment of the present invention.

FIG. 10 is a flowchart illustrating an UE's SCCH reception operation according to an embodiment of the present invention. Referring to FIG. 10, after starting SCCH reception in step 1001, a UE determines in step 1002 whether it is now in an SI reception (RX) mode or in a packet data reception mode. That is, the UE determines whether it is in a mode of receiving shared data, or in a mode of receiving non-shared data.

If it is determined in step 1002 that the UE is now in the SI reception mode, i.e., shared data reception mode, the UE receives an SCCH signal including control information through CCEs corresponding to SCCH subset B, which is SCCH information for SI reception, in step 1003. Thereafter, in step 1004, the UE demodulates and detects SCCH with a common UE ID. The common UE ID is used in step 1004 because the common UE ID is generally used for SI transmission. The term 'common UE ID' is the same allocated UE ID with which several UEs transmit SDCH in common at a time.

In step 1005, the UE perform CRC check on the SCCH, and if the UE succeeds in the CRC check, the UE determines SDCH resource elements using Ncce, in step 1006, determining that the received SCCH is SCCH transmitted to the UE itself. In step 1007, the UE receives SDCH using the determined SDCH resource elements.

The UE, when it has no information on Ncce, determines a position of a start OFDM symbol using Nmax_cce, as described above.

In step 1006, the UE determines an OFDM symbol where SDCH starts, using Ncce, and calculates the correct amount of and positions of SDCH resources using the found OFDM symbol together with information on the resources allocated in SCCH, thereby determining SDCH resource elements.

However, if it is determined in step 1002 that the UE is now in the normal packet data reception mode, i.e., the non-shared data reception mode, the UE receives an SCCH signal including control information through CCEs corresponding to SCCH subset A which is SCCH information for packet data reception in step 1008.

In step 1009, the UE demodulates and detects SCCH with its own UE ID. After detecting SCCH, the UE performs CRC check on the detected SCCH in step 1010. If the UE succeeds in the CRC check, the UE determines SDCH resource elements using allocated resource information and Ncce information signaled over SCCH in step 1011. To determine SDCH resource elements in step 1011, the UE calculates the amount of and positions of SDCH resources based on the position of the OFDM symbol where SDCH starts, determined using the allocated resource information and Ncce information signaled over SCCH.

After calculating the amount of and positions of SDCH resources in step 1011, the UE receives SDCH in step 1007. However, if it is determined in step 1010 that the UE fails in the CRC check, the UE ends the SCCH reception operation in step 1012. For reference, when the receiver simultaneously attempts SI reception and packet data reception in one TTI, it performs both the procedures.

Figure 11:
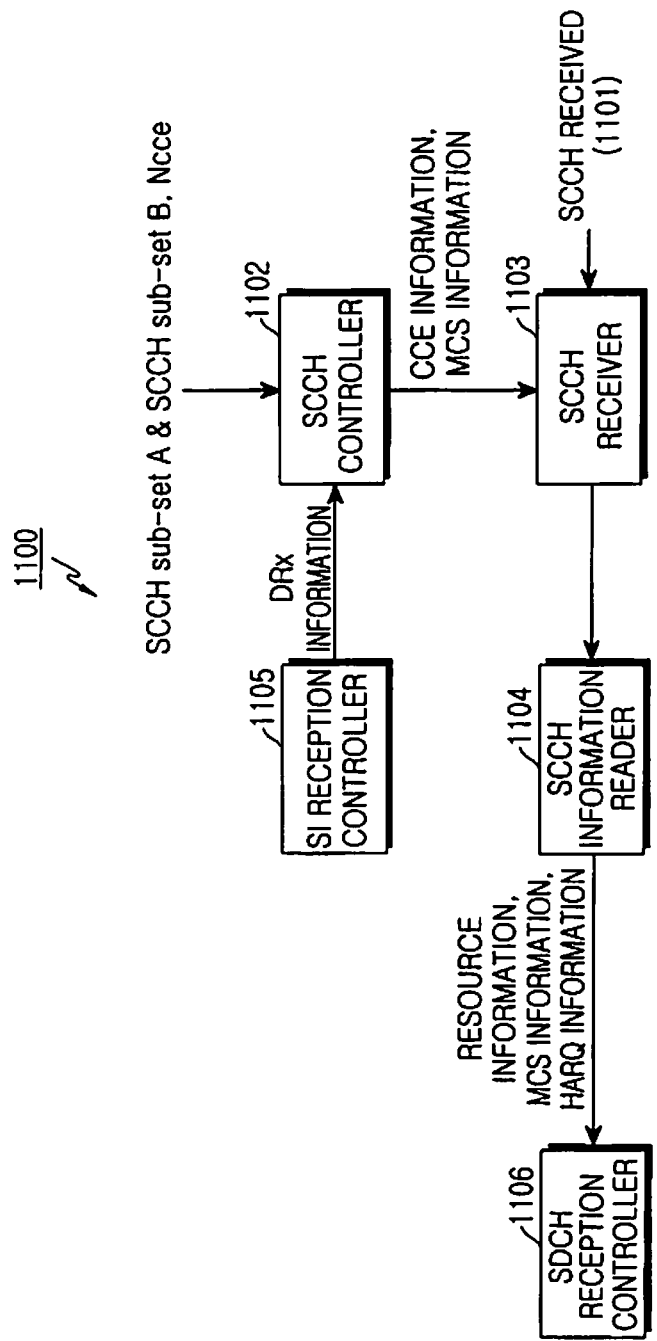
FIG. 11 is a block diagram illustrating a structure of a UE for receiving SDCH according to an embodiment of the present invention.

FIG. 11 is a block diagram illustrating a structure of a UE 1100 for receiving SDCH according to an embodiment of the present invention.

Referring to FIG. 11, an SCCH receiver 1103 receives an SCCH. In order to receive SCCH, the SCCH receiver 1103 should perform blind detection. For this purpose, the SCCH receiver 1103 needs CCE information and MCS information.

The CCE information and MCS information are provided to the SCCH receiver 1103 by an SCCH controller 1102, and the SCCH controller 1102 should determine whether the UE 1100 should receive SI or should receive normal packet data, in order to acquire the correct CCE information and MCS information. For the determination, an SI reception controller 1105 provides the SCCH controller 1102 with information indicating whether the UE 1100 now receives SI or receives normal packet data.

If the UE 1100 is now in the SI reception mode, the SCCH controller 1102 generates CCE and MCS information using the SCCH subset B and Ncce information received from the upper layer by signaling. However, if the UE 1100 is in the normal packet data reception mode, the SCCH controller 1102 generates CCE information and MCS information based on Ncce information and SCCH subset A, and provides the generated information to the SCCH receiver 1103. The SCCH controller 1102 previously receives the SCCH subset A, SCCH subset B, and Ncce from a transmission side through upper layer signaling.

If the SCCH receiver 1103 receives SCCH under the control of the SCCH controller 1102, an SCCH information reader 1104 reads SCCH information, and transfers the read SCCH information of resource information, MCS information and HARQ information to an SDCH reception controller 1106 for receiving SDCH, and an SDCH controller 1106 controls to receive SDCH using the provided information. When the UE 1100 is in the SI reception mode, the SCCH receiver 1103, under the control of the SCCH controller 1102, demodulates SCCH using a common UE ID, and when the UE 1100 is in the normal packet data reception mode, the SCCH receiver 1103 demodulates SCCH using a unique UE ID of the UE 1100.

UEs receiving normal packet data receive variable CCEs or fixed CCEs to demodulate SCCH, and UEs intending to receive SI receive fixed CCEs to demodulate SCCH.

When SI is transmitted, fixed CCEs are used for transmitting SCCH for the SI, and when SI is not transmitted, fixed CCEs can be used for SCCH transmission for scheduling of normal packet data, so a UE transmitting normal packet data also need to observe variable CCEs.

The embodiment of the present invention to be described below enables a UE, which has no information on ACK/NACK resources over which ACK/NACK information will be transmitted/received even while transmitting SCCH, to receive SCCH for receiving BCH over which SI is transmitted, using the REs, except for the REs occupied for ACK/NACK transmission among all the resources for control information transmission.

That is, according to the present invention, even in the system that allocates REs of CCEs transmitting SCCH, using the REs except for the REs occupied for ACK/NACK transmission among all the resources for control information transmission, a UE having no information on the amount of ACK/NACK resources can receive through the SCCH, scheduling information of SDCH where BCH over which SI is transmitted is transmitted. For that purpose, the SCCH, providing information on an SDCH over which a BCH is transmitted, transmits the information with fixed CCEs always including fixed REs regardless of the number of ACK/NACK CCEs. The SCCH, providing scheduling information of an SDCH for receiving packet data, transmits the information through variable CCEs including the REs except for the REs occupied for ACK/NACK CCEs. However, when there is no SCCH to be transmitted through fixed CCEs due to the absence of BCH transmission, SCCH providing scheduling information of SDCH for a normal packet can be transmitted using the fixed CCEs.

Figure 12A:
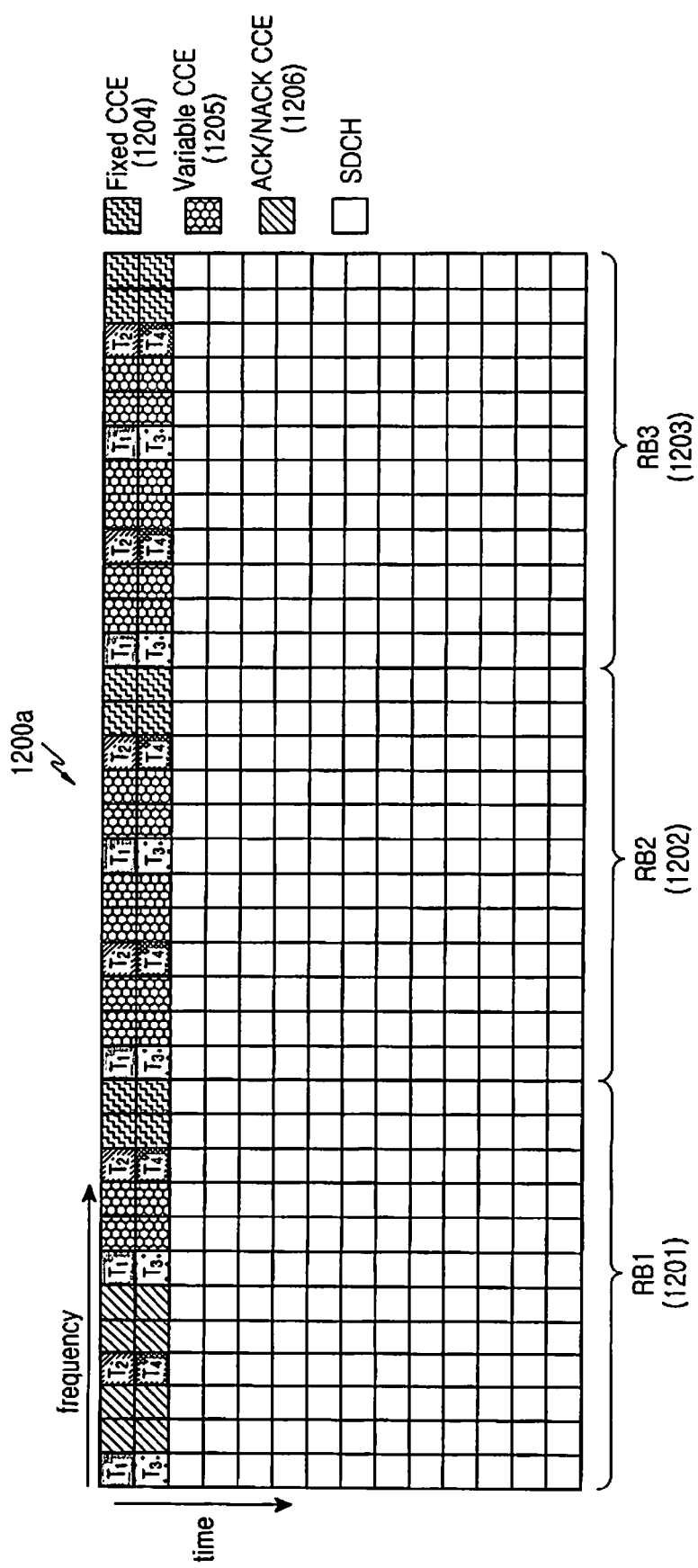
FIGS. 12A and 12B are diagrams illustrating a structure for SCCH channel establishment according to an embodiment of the present invention.
Figure 12B:
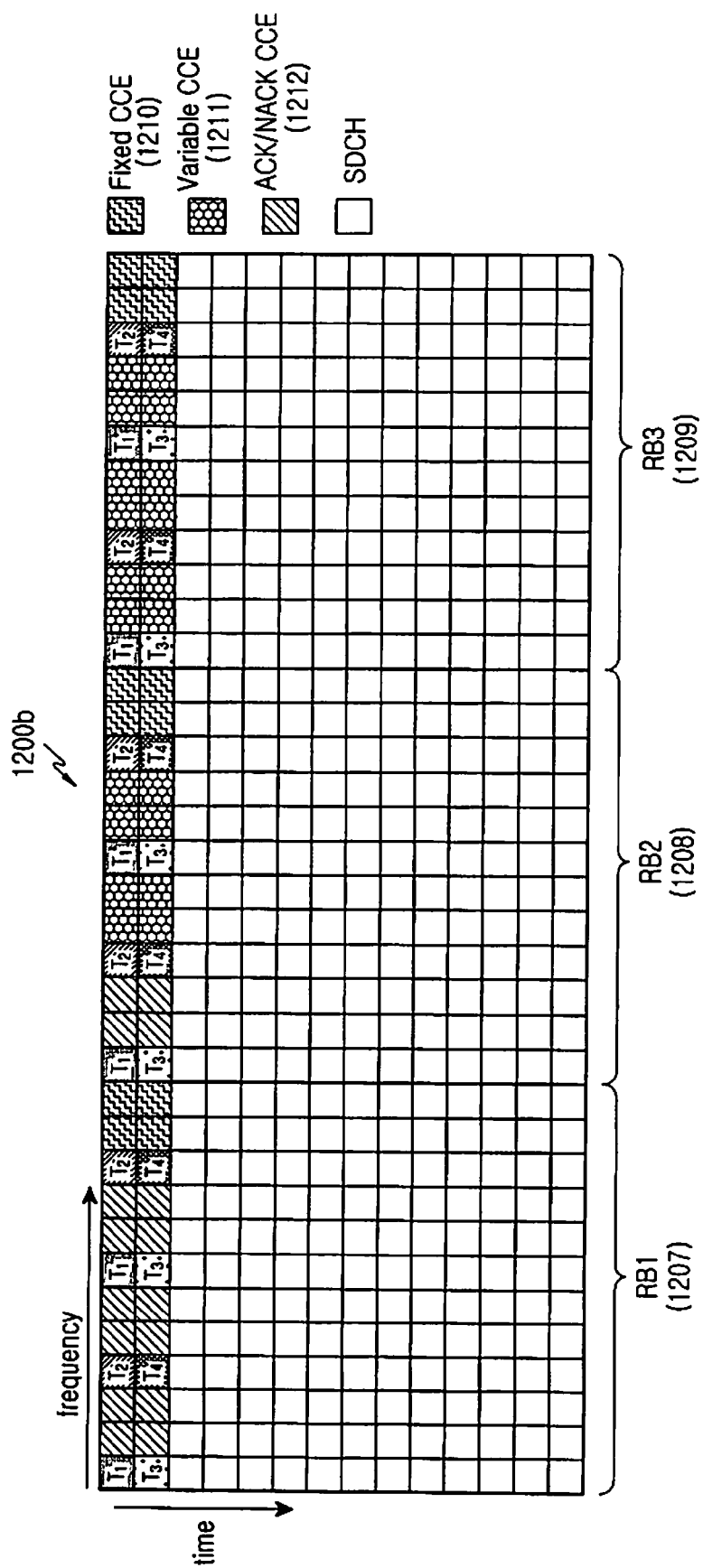

FIGS. 12A and 12B are diagrams illustrating a structure for SCCH channel establishment according an embodiment of the present invention. It is assumed in FIGS. 12A and 12B that an SCCH is transmitted only in the first two OFDM symbols within TTI. If the total number of CCEs increases, it is also possible to use three OFDM symbols, and if the total number of CCEs decreases, it is also possible to use one OFDM symbol.

Herein, data transmission is possible from the next symbol of the OFDM symbol used for CCE transmission.

Most notably, FIGS. 12A and 12B introduce two types of CCE regions classified into fixed CCEs 1204 and 1210, and variable CCEs 1205 and 1211. The variable CCEs 1205 and 1211 are CCEs for transmitting SCCH for normal packet data transmission, and are defined for obtaining the maximum diversity effect by dispersing positions of REs transmitting one CCE in the frequency domain occupied by all CCEs.

In FIGS. 12A and 12B, a plurality of unit CCEs are transmitted in the region of the variable CCEs 1205 and 1211. When necessary, in order for the variable CCEs 1205 and 1211 to transmit as many remaining REs as possible, positions of actually transmitted resources are changed according to the number of ACK/NACK CCEs in order to transmit SCCH using the remaining REs except for pilot Reference Signal (RS) symbols T1, T2, T3, and T4, and ACK/NACK CCEs 1206 and 1212.

In FIG. 12A, reference numeral 1200a represents where 8 REs are used for ACK/NACK CCE resources, and reference numeral 1200b of FIG. 12B represents where 16 REs are used for ACK/NACK CCE transmission. Because information on the amount of the resources is provided through SI, a UE receiving the SI receives variable CCEs 1205 and 1211 using the remaining REs, i.e., all the REs remaining after excluding the resources for ACK/NACK CCEs.

The fixed CCEs 1204 and 1210 include REs 1204 and 1210 in FIGS. 12A and 12B, and are defined so as to always occupy fixed REs without being affected by the ACK/NACK CCEs 1206 and 1212. By defining the fixed REs, the UE can receive an SCCH through fixed CCEs even without any information on the amount of ACK/NACK CCE resources.

Herein below, with reference to Table 4, a description will be made of an example of SCCH information established to a UE by a base station according to an embodiment of the present invention. More specifically, a description will first be made of SCCH information received in a normal case where shared data such as SI is not received. In this case, it is possible to directly establish SCCH channel information with a subset among all SCCHs, or to establish SCCH channel information in a manner of providing CCE information and MCS information. The term 'subset' as used herein means a set of SCCHs the UE should receive among the SCCHs used in the cell.

Referring to FIGS. 12A and 12B, in the SI information mode, fixed CCE information (positions of fixed CCEs) and MCS information (the number of fixed CCEs) are provided so that the UE can receive SCCH using the fixed CCEs 1204 and 1210. The SCCH subset and Ncce information for the fixed CCEs and variable CCEs can be previously provided by upper layer signaling, or can be previously defined in the specification.

Table 4 shows an example of establishing SCCH according to an embodiment of the present invention.

TABLE 4

| Case | Establishment Information |
|---|---|
| Normal reception | SCCH subset A = (SCCH #1, #2, #3, #4, #5, #6, #7, #8, #9, #10) or SCCH subset A = ((CCE (#1, #2, #3, #4, #5, #6), MCS (1, 2, 3)) |
| SI reception | SCCH subset B = (SCCH #7, #10) or SCCH subset B = ((CCE (#1, #2, #3), MCS (2, 3)) |

Figure 13:
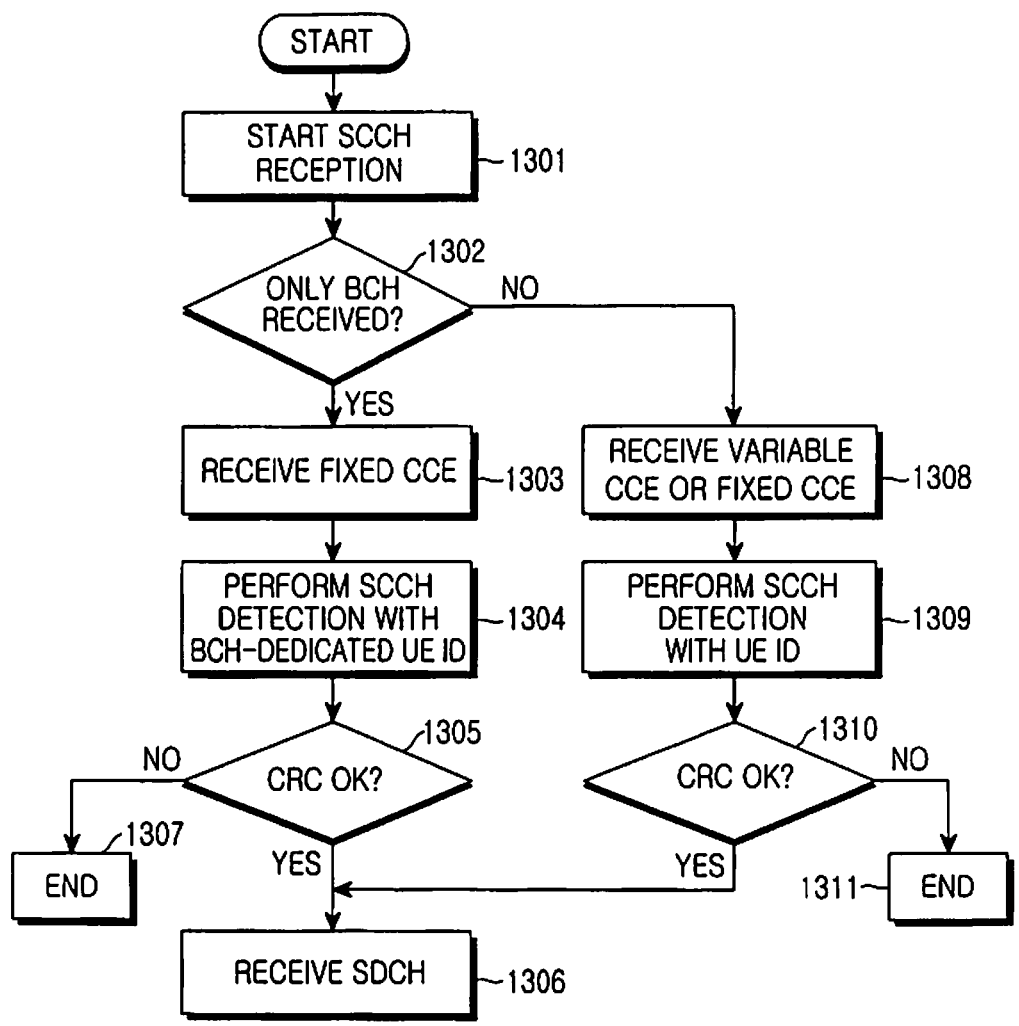
FIG. 13 is a flowchart illustrating a UE's SCCH reception operation according to an embodiment of the present invention.

FIG. 13 is a flowchart illustrating a UE's SCCH reception operation according to the fourth embodiment of the present invention. Referring to FIG. 13, after starting SCCH reception in step 1301, a UE determines in step 1302 whether or not it receives only the BCH. The UEs that have not received SI are the UEs that should receive only the BCH, because they should receive only the SI as they have not received scheduling information for receiving packet data from the base station. If it is determined in step 1302 that the UE receives only the BCH, the UE receives an SCCH signal transmitting control information through fixed CCEs 1204 and 1210 in step 1303. Thereafter, in step 1304, the UE attempts SCCH demodulation and detection on the received SCCH signal with a BCH-dedicated UE ID. In step 1305, the UE performs CRC check on the detected SCCH, and if the UE has succeeds in the CRC check, the UE receives SDCH using the information on the resources allocated in the detected SCCH, and receives BCH through the SDCH reception in step 1306.

However, if it is determined in step 1302 that the UE has already received SI information, the UE receives SCCH through variable CCEs 1205 and 1211, or fixed CCEs 1204 and 1210, in step 1308, because the UE only needs to receive scheduling information for packet data from the base station or to receive updated SI information, as it is a UE receiving normal packet data. When there is no BCH transmission at the corresponding timing, because fixed CCEs are free, SCCH including scheduling information of SDCH over which normal packet data is transmitted can be transmitted using the fixed CCEs. Therefore, the present invention provides the normal-mode UE receiving packet data so as to receive SCCH through both the fixed CCEs and variable CCEs. The normal-mode UE, as it also needs to receive BCH, continuously receives SCCH through fixed CCEs. When the fixed CCEs are not used, the fixed CCEs can be used for SCCH transmission for packet data.

In step 1309, the UE performs SCCH demodulation on the received SCCH signal with its own UE ID to detect control information. The UE ID corresponds to any one of a UE ID uniquely allocated to the UE, a BCH-dedicated UE ID, and a group UE ID. After detecting the SCCH signal in step 1309, the UE performs CRC check on the detected SCCH signal in step 1310. If the UE has succeeded in the CRC check, the UE receives SDCH according to scheduling information included in the SCCH signal in step 1306, because there is SCCH signal transmitted to the UE itself. However, if it is determined in step 1310 that the CRC check result is 'CRC bad', the UE ends the SCCH reception operation in step 1311 without performing any operation since there is no SCCH transmitted to the corresponding UE itself.

Figure 14:
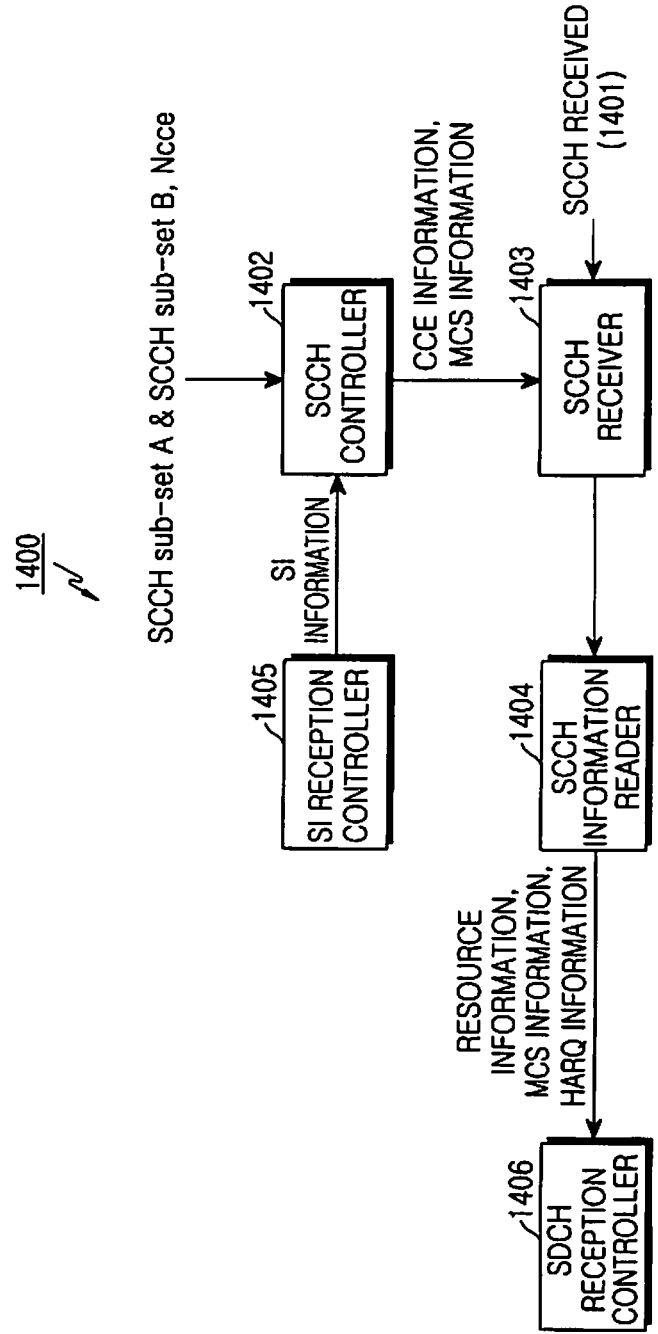
FIG. 14 is a block diagram illustrating a structure of a UE's reception apparatus according to an embodiment of the present invention.

FIG. 14 is a block diagram illustrating a structure of a UE's reception apparatus 1400 according to an embodiment of the present invention. Referring to FIG. 14, an SCCH receiver 1403 receives an SCCH transmitted from an undepicted transmission apparatus. The SCCH receiver 1403 should perform blind detection in order to receive the SCCH, and for this purpose, needs CCE information and MCS information.

The CCE information and MCS information are provided to the SCCH receiver 1403 by an SCCH controller 1402, and the SCCH controller 1402 should determine whether the UE 1400 receiving SCCH should receive SI or should receive normal packet data, in order to detect the correct CCE information and MCS information. For the determination, an SI reception controller 1405 provides the SCCH controller 1402 with SI information indicating whether the UE 1400 now receives SI, or receives normal packet data.

The SCCH controller 1402 according to the present invention receives SI information, SCCH subset information indicating CCEs which are transmission resource units allocated for receiving the SI and the packet data, and the number Ncce of allocated CCEs, and provides the SCCH receiver 1403 with CCE information indicating SCCH transmission resources and MCS information for SCCH.

In addition, the SCCH controller 1402 determines if it has received SI, depending on the SI information provided from the SI reception controller 1405. If the UE 1400 should receive only the BCH rather than the normal packet data due to its failure to receive SI, the SCCH controller 1402 controls the SCCH receiver 1403 to receive an SCCH through the fixed CCEs among all the resources for control information.

However, if the SI has already been received, the SCCH controller 1402, because it should receive packet data, controls the SCCH receiver 1403 to receive an SCCH through variable CCEs or fixed CCEs among all the resources for control information.

An SCCH information reader 1404 reads information for packet data reception from SCCH control information that the SCCH receiver 1403 has received. An SDCH reception controller 1406 receives SDCH over which the packet data or the SI is transmitted, based on the information read by the SCCH information reader 1404.

As is apparent from the foregoing description, according to the present invention, the receiver can normally receive a control channel even when it cannot correctly determine the number of control channels due to the variable change in the control channel, and can make a demodulation attempt on the restrictive control channel format, thereby contributing to a reduction in the reception complexity.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for receiving control information by a User Equipment (UE) in a mobile communication system, the method comprising:

if the UE operates in a non-Discontinuous Reception (DRX) mode, receiving information indicating variable Control Channel Elements (CCEs) allocated for first UEs operating in the non-DRX mode among CCEs included in control channels used in the mobile communication system, selecting the variable CCEs, and receiving the control information over a control channel including the selected CCEs, the information including information on a location of the variable CCEs and Modulation and Coding Scheme (MCS) level information for the variable CCEs; and if the UE operates in a DRX mode, receiving information indicating fixed CCEs allocated for second UEs operating in the DRX mode, selecting the fixed CCEs, and receiving the control information over the control channel including the selected CCEs, the information including information on a location of the fixed CCEs and MCS level information for the fixed CCEs, wherein one CCE includes at least one Resource Element (RE) and is allocated for a common control channel.

2. The method of claim 1, wherein the variable CCEs are determined according to a number of CCEs used by a base station.

3. The method of claim 1, wherein the fixed CCEs are determined independently of a number of CCEs used by a base station and ACKnowledge/Not-ACKnowledge (ACK/NACK) transmission resources.

4. An apparatus for receiving control information in a mobile communication system, the apparatus comprising:

a processor for acquiring information indicating variable Control Channel Elements (CCEs) allocated for first User Equipments (UEs) operating in a non-Discontinuous Reception (DRX) mode among CCEs constituting control channels and selecting the variable CCEs if a UE operates in the non-DRX mode, the information including information on a location of the variable CCEs and Modulation and Coding Scheme (MCS) level information for the variable CCEs, and acquiring information indicating fixed CCEs allocated for second UEs operating in a DRX mode and selecting the fixed CCEs if the UE operates in the DRX mode, the information including information on a location of the fixed CCEs and MCS level information for the fixed CCEs; and a control information receiver for receiving the control information through the CCEs selected by the processor, wherein one CCE includes at least one Resource Element (RE) and is allocated for a common control channel.

5. The apparatus of claim 4, wherein the variable CCEs are determined according to a number of CCEs used by a base station.

6. The apparatus of claim 4, wherein the fixed CCEs are determined independently of a number of CCEs used by a base station and ACKnowledge/Not-ACKnowledge (ACK/NACK) transmission resources.

* * * * *